(12) United States Patent
Capotosto

(10) Patent No.: US 7,557,286 B2
(45) Date of Patent: Jul. 7, 2009

(54) EXERCISE TRAINING DEVICE

(76) Inventor: Dino J Capotosto, 11763 Trafalgar Road, Georgetown, Ontario (CA) L7G 4S4

( * ) Notice: Subject to any disclaimer, the term of this patent is extended or adjusted under 35 U.S.C. 154(b) by 10 days.

(21) Appl. No.: 11/822,488

(22) Filed: Jul. 6, 2007

(65) Prior Publication Data
US 2008/0202317 A1 Aug. 28, 2008

(30) Foreign Application Priority Data
Feb. 22, 2007 (CA) .................... 2579380

(51) Int. Cl.
G10D 13/02 (2006.01)
A63B 21/06 (2006.01)

(52) U.S. Cl. .................... 84/422.4; 482/44; 482/45; 482/50; 482/93; 482/109

(58) Field of Classification Search ............. 84/422.4; 482/44, 45, 50, 93, 109
See application file for complete search history.

(56) References Cited

U.S. PATENT DOCUMENTS

| 1,605,240 | A | * | 11/1926 | Johnson | 473/49 |
| 1,953,619 | A | * | 4/1934 | Ludwig | 84/422.4 |
| 2,521,336 | A | * | 9/1950 | Bramson | 84/422.4 |
| 2,772,887 | A | * | 12/1956 | Blake | 473/233 |
| 3,006,646 | A | * | 10/1961 | Nanni | 482/45 |
| 3,084,547 | A | * | 4/1963 | Nielsen | 73/379.08 |
| 3,136,546 | A | * | 6/1964 | Connolly | 473/234 |
| 3,575,419 | A | * | 4/1971 | Davis | 473/234 |
| 3,866,508 | A | * | 2/1975 | Huslig | 84/422.4 |
| 3,874,660 | A | * | 4/1975 | Brethen | 482/109 |
| 3,998,123 | A | * | 12/1976 | Hinger | 84/422.4 |
| 4,302,008 | A | * | 11/1981 | Lard | 482/109 |
| 4,476,768 | A | * | 10/1984 | Willis | 84/422.4 |
| 4,488,470 | A | * | 12/1984 | Larrain | 84/422.4 |
| 4,614,343 | A | * | 9/1986 | Radway | 473/234 |
| 4,634,121 | A | * | 1/1987 | Sasaki | 473/457 |
| 4,719,836 | A | * | 1/1988 | Baumgart | 84/422.4 |
| D295,872 | S | * | 5/1988 | Koumarianos | D17/22 |
| 4,819,935 | A | * | 4/1989 | Dirksing et al. | 482/109 |
| 5,044,250 | A | * | 9/1991 | Beyer | 84/422.4 |
| 5,060,933 | A | * | 10/1991 | Cedro | 482/44 |
| 5,312,308 | A | * | 5/1994 | Hamilton et al. | 482/44 |
| 5,316,531 | A | * | 5/1994 | Spence | 482/93 |
| 5,328,431 | A | * | 7/1994 | Winslow | 482/106 |
| 5,364,325 | A | * | 11/1994 | Matthews | 482/111 |
| 5,443,435 | A | * | 8/1995 | Wilkinson | 482/74 |
| 5,449,333 | A | * | 9/1995 | Carter | 482/109 |
| 5,503,056 | A | * | 4/1996 | Evans | 84/422.4 |
| 5,577,966 | A | * | 11/1996 | Duran | 473/234 |
| 5,581,031 | A | * | 12/1996 | Blankenship, Jr. | 84/453 |
| 5,653,664 | A | * | 8/1997 | Jennings | 482/93 |
| 5,725,436 | A | * | 3/1998 | Miller et al. | 473/46 |
| 6,010,415 | A | * | 1/2000 | Miggins | 473/437 |
| 6,028,260 | A | * | 2/2000 | LaLonde | 84/422.4 |
| 6,028,261 | A | * | 2/2000 | Johnson | 84/422.4 |
| 6,050,908 | A | * | 4/2000 | Muhlhausen | 473/457 |
| 6,069,308 | A | * | 5/2000 | Rabb | 84/422.4 |
| D428,946 | S | * | 8/2000 | Boorstein | D21/679 |

(Continued)

Primary Examiner—Jeffrey Donels
Assistant Examiner—Robert W Horn

(57) ABSTRACT

An exercise training device having a stick portion, which may simulate the handle of a drumstick, weight means attachable to one end of the stick portion, the weight means biasing the movement of the stick portion, and providing stimulation to muscles used, for strengthening, flexibility, control, agility and endurance.

4 Claims, 2 Drawing Sheets

U.S. PATENT DOCUMENTS

| | | | |
|---|---|---|---|
| 6,113,501 A * | 9/2000 | Richards | 473/46 |
| 6,279,592 B1 * | 8/2001 | Yamamoto | 135/77 |
| 6,310,278 B1 * | 10/2001 | Butler | 84/422.4 |
| D451,564 S * | 12/2001 | Dean | D21/684 |
| 6,539,965 B1 * | 4/2003 | White, III | 135/66 |
| 6,890,264 B2 * | 5/2005 | Verona | 473/49 |
| 6,949,036 B2 * | 9/2005 | Ciesar et al. | 473/457 |
| 7,040,996 B2 * | 5/2006 | Grandin | 473/46 |
| 7,176,369 B1 * | 2/2007 | Brooks | 84/422.4 |
| 7,297,078 B2 * | 11/2007 | Libonati | 473/457 |
| D556,820 S * | 12/2007 | Parikh et al. | D17/22 |
| D556,841 S * | 12/2007 | Oates | D21/679 |
| D573,670 S * | 7/2008 | Mullins | D21/679 |
| 2002/0165070 A1 * | 11/2002 | Pullaro | 482/109 |
| 2004/0063554 A1 * | 4/2004 | Wince | 482/108 |
| 2005/0176561 A1 * | 8/2005 | Soukeras | 482/109 |
| 2008/0014835 A1 * | 1/2008 | Weston et al. | 446/484 |
| 2008/0202317 A1 * | 8/2008 | Capotosto | 84/422.4 |

* cited by examiner

EXERCISE TRAINING DEVICE

FIELD OF THE INVENTION

The invention relates to a training device for training and exercising persons in hand and arm exercises, for many purposes.

The training device assists in building muscles and coordination in the fingers, hands, wrists, and arms for various movements. Drumstick movements are one example.

BACKGROUND OF THE INVENTION

Development of the muscles and co ordination in the movements, of the fingers, hands, wrists, and arms is useful for many purposes. A person may wish to simply develop muscles and skills in the arms, for a variety of reasons. A person with some impairment or handicap may wish to revive and restore such muscles and skills to a former level. In particular, in the use of drumsticks, the device is helpful in the development of particular skills and muscle groups. It is common to hold the drumstick between the thumb and fingers of each hand, with the rear end of the drumstick loosely positioned underneath the palm of the hand. The thumb is uppermost and the forefinger is beneath the stick acting as a pivot point. The remaining fingers are curled beneath the free or rear end of the stick. Drum strokes are usually achieved by flexing the fingers against the free end of the drumstick. This causes the drumstick to pivot about the thumb and fore finger holding the drumstick. The drumstick head thus swings down and up. This enables a player to play a variety of different strokes, both hard and soft, and rapid and slow in an advantageous manner. Drumsticks are also used in other holding positions, somewhat more like chopsticks. In these positions the action of the drumstick is achieved usually by a rapid wrist movement.

The development of skills, and muscle tone to achieve these various movements is one of the objectives of drum players. Experienced and skilled drum players will usually wish to warm up their hands and wrists, before starting to play.

This of course can be done with conventional drumsticks. However, unless the drumsticks are used to actually strike the drum head, the action of simply swinging the drumsticks freely in the air will not produce the same development. For this reason, some drum players employ a special form of muffle for muffling the drum heads during the practice or exercise session. However these muffle devices are not entirely satisfactory. They alter the touch of the drumstick on the drum head, and they do not entirely prevent the sound of the drum practice.

For all of these reasons it is desirable to provide an exercise device for a drum player to use when practicing the various drum action movements. This exercise device will enable the player to practise various strokes repeatedly, without the use of drums at all. This will prevent any noise. It will also enable the player to exercise and practise wherever he wishes, at a moments notice.

The exercise device has many applications outside the field of drumming. Exercises for the fingers, hands, wrists, and arms are useful in a wide variety of situations and conditions.

BRIEF SUMMARY OF THE INVENTION

The invention therefore seeks to provide an exercise training device having a stick portion, which in some cases may simulate the handle of the drumstick, weight means attached to one end of the stick portion, the weight means biasing the movement of the stick portion, and providing stimulation to the muscles used.

More particularly it is objective of the invention to provide such a device in which the stick portion has forward and rear ends and in which the weight means consists of a cylinder portion attachable to the rear end of the stick portion, providing a form of rearward extension to the stick portion.

More particularly, it is an objective of the invention to provide such a device in which there are provided a plurality of additional weights, which can be attach to the cylinder portion, for varying the weighting of the stick portion to suit the ability and exercise desired.

Preferably, the cylinder portion will have a counterbore, which can be slid onto the free end of the stick portion, and some form of fastening within the cylinder portion for fastening the same to the stick portion. Fastening can be by adhesive, or a screw, of other means.

Preferably, the cylinder will have a central bore which is threaded, and the plurality of weights will be attachable in varying numbers, by means of a threaded fastening such as a bolt.

Preferably the stick portion has a number of indicia, such as notches, indicating various positions, at which the stick portion may be held between thumb and forefinger, for varying exercises.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

As generally described above the invention relates to a exercise training device for exercising and training the fingers, hands, wrists and some muscles of the arms. In one particular application, it may be considered as designed for training the fingers, hands, wrists and arms in movements required for drumstick operation, for the playing of drums. Various different stroke techniques are used in drumming. The device is intended to provide a convenient means for exercising and training, without actually using full length drumsticks on a set of drums.

The device can be used anywhere, and does not require a drum head, or any other object which must be struck, in order to achieve useful results. In use it is silent and can thus be used anywhere, in public or private, without interfering with other persons.

Figure 3:
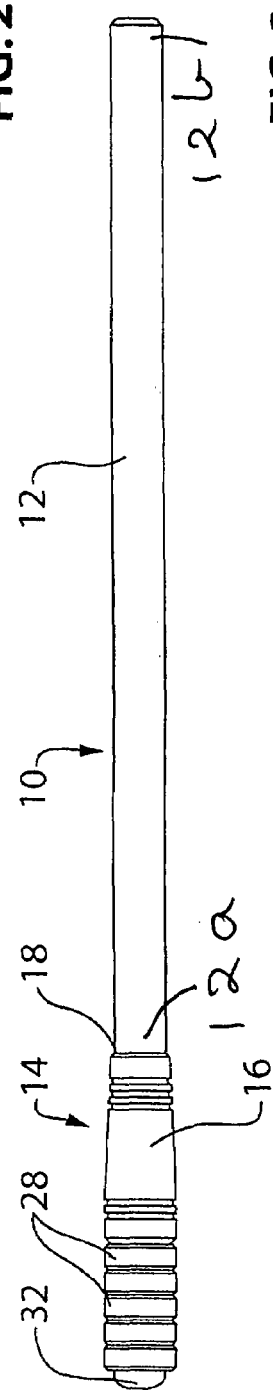
FIG. 3 is a side elevation of the entire training device, in one embodiment.

For this purpose, reference may be made first of all to FIG. 3. This shows an illustration in a side elevation, an exercise device embodying the invention. The device is illustrated generally as (10).

The device is of application in many situations, some of which are suggested herein, such as muscle development, hand coordination, physiotherapy, and simple warm up routines. Drum stick exercises are merely one example of an application for the device.

In the particular case of some of the more popular drumstick techniques, a drumstick is held loosely in the palm of the hand, with the thumb on top and the four fingers underneath. The drumstick is more or less balanced around the fore finger. By moving the other three fingers rapidly up and down, the drumstick impact end can then be made to strike the drum rapidly and with a variety of different rhythms and tones. All of this is well known. Various other drumstick techniques are used by drummers in many situations. For example, marching drummers use drumsticks usually held somewhat in the manner of chopsticks. In any event, drummers often find it is desirable to exercise and strengthen their muscles, so as to permit the enjoyment of playing for extended periods of time. It is also desirable even for experienced drummers, to have a period of warm up exercises before actually playing.

However, in many other situations, exercising of the fingers, hands, wrist and arm muscles is desirable, and the invention will also provide useful application in many of these cases. For example, a person suffering with some kind of disability of the hands, possibly resulting from injury, or arthritis, may find it useful to exercise using the training device and thereby maintain more flexibility. Persons playing other musical instruments requiring rapid finger movements may also find the training device useful.

With a view to achieving these objectives, the device (10) consists of a stick portion (12), and biasing weight (14). The stick portion may be in the order of for example about twelve inches more or less, in length, and typically have the diameter and feel of the handle of the drumstick, although this is not absolutely essential. The stick portion has a forward end (12a) and a rearward end (12b).

Figure 1:
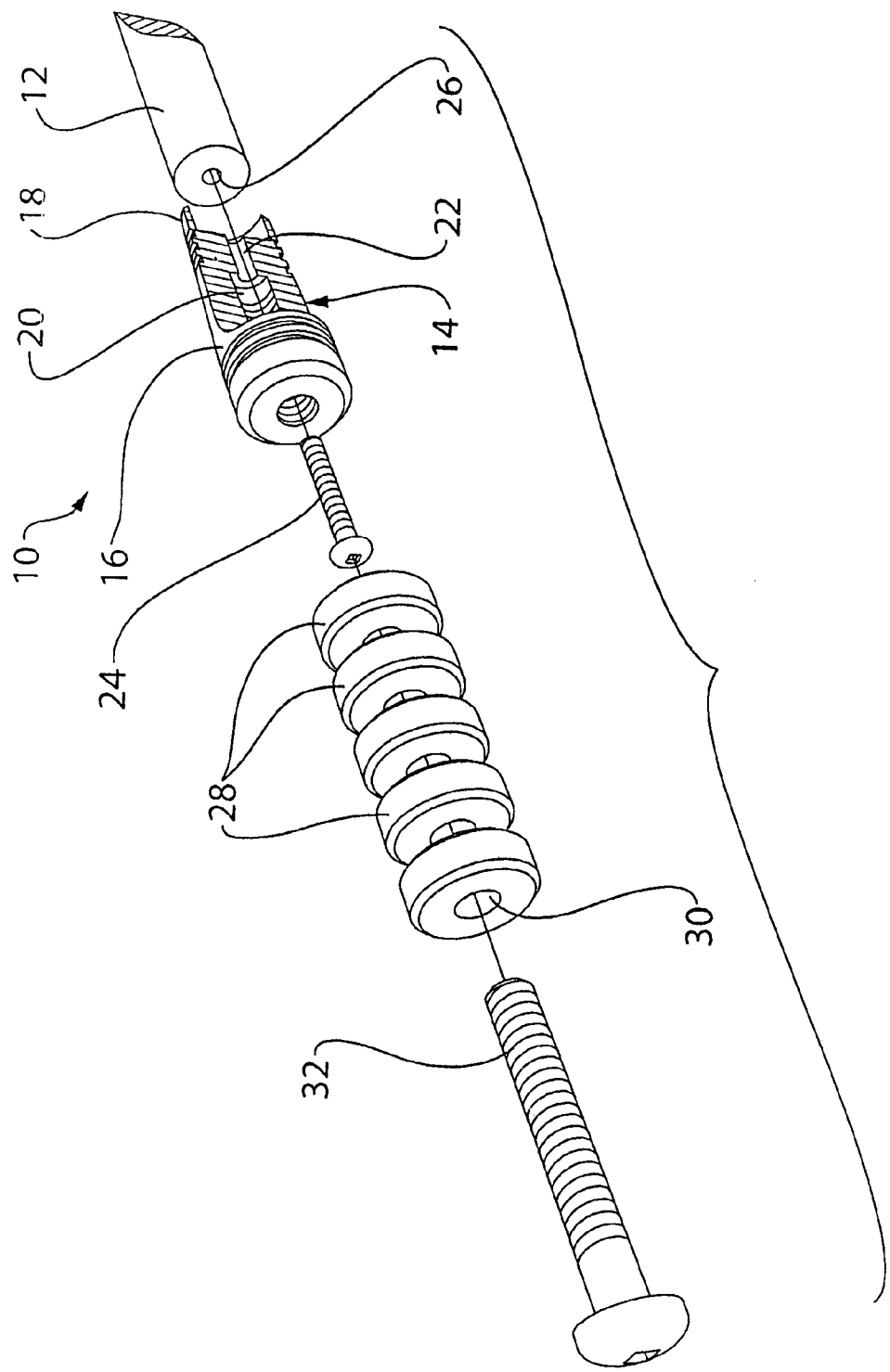
FIG. 1 is a perspective illustration of one end of an exercise training device showing the weight attachment.
Figure 2:
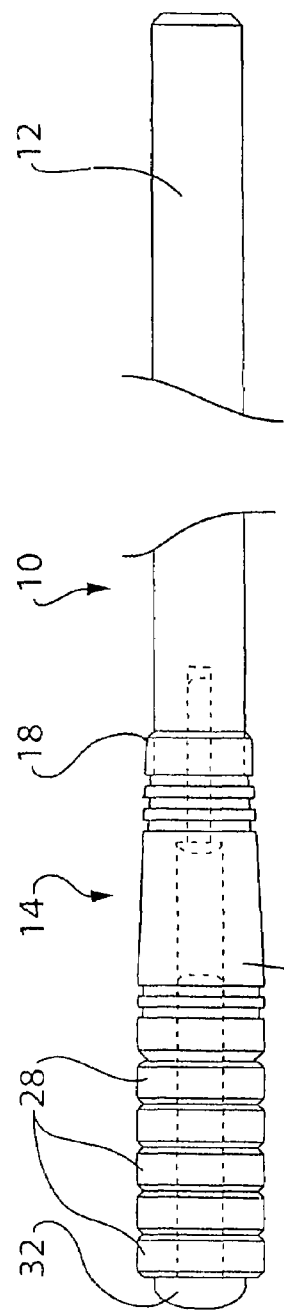
FIG. 2 is a side elevation partially cut away of the training device of FIG. 1.

The biasing weight portion (14) is shown in more detail in FIG. 1. It will be seen to comprise a main body portion (16), which will be of metal, typically for example brass. It will have a leading end sleeve (18), adapted to provide a short sleeve for sliding over the rearward end of the stick portion (12). Within the main body (16), there is a threaded main bore (20). A smaller diameter passage (22) extends from the threaded main bore (20) through to the sleeve (18), and is adapted to receive for example a wood screw (24). The wood screw (24) will fit freely down within the threaded main bore (20), and can then be screwed firmly into the end of the wooden stick (12), at the fastening recess (26). This is merely one method of fastening the weight to the stick portion. Adhesives such as (27) FIG. 4, are known which would serve equally well, so that the screw would not be required.

Since various different exercises may require more or less biasing weight, the invention provides a plurality of generally annular weight members (28), each of which has a central through opening (30) The weights can be attached to the main body 16), by means such as a weight fastening bolt (32) The fastening bolt (32) can be received in the main threaded bore (20) within body (16).

Preferably, the main body (16) is somewhat tapered, so as to narrow in diameter where it joins the stick portion (12), thus providing an aesthetic appearance.

Figure 4:
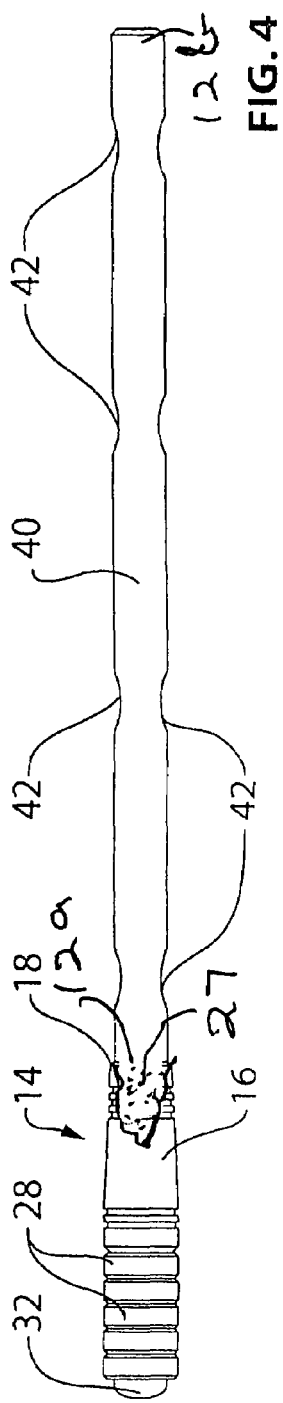
FIG. 4 is a side elevation of an alternate embodiment.

In an alternate embodiment, FIG. 4, the stick portion (40) may be provided with one or more spaced apart indicia. In this case these are in the form of generally concave indentations (42). These concave indentations (42) assist in positioning the stick portion( ) over the forefinger, for example, when practicing drum stroke movements, and also significantly improve the comfort of the use of the device. The indicia also lend themselves to the practise of various different exercises, with different degrees of effort, for development of specific muscle groups, for a variety of purposes.

By positioning the hand, or the fore finger, at various different positions along the stick portion the degree of effort required for an exercises can be increased or decreased.

In operation, the user will simply grasp the stick portion between his forefinger and thumb, and will then operate the device up and down using the three fingers of the same hand. In order to provide greater weight, to perform more strenuous exercises, one or more weights (28) may be added in the manner shown in FIG. 1.

The manner of use for various other exercises may vary very widely, although the particular exercise described above relating to drumstick techniques will also provide significant useful exercise for many other applications.

Various different exercises can be performed by positioning the thumb and forefinger at different positions, indicated by the indicia, along the stick portion.

Other exercises can be carried out with the device, by for example holding the stick at the very end and swinging the stick and weight around, or moving it up and down.

The device can be of use in numerous isometric and/or isotonic exercises. It provides weight resistance to a variety of exercises, thus enabling strengthening of finger, wrist and forearms, as well as resisting the development of conditions such as tennis elbow, tendonitis, carpal tunnel syndrome, and even arthritis of the hand and arm joints.

The device assists both in increasing speed of movement, flexibility, stroke consistency, endurance, and power, in numerous hand and arm movements, and especially in drumstick movements.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A exercise training device comprising;
   a stick portion adapted to be grasped with the hand, said stick portion defining a forward and rear end;
   a weight device attached to said rear end of the stick portion, whereby when the stick portion is grasped, with the finger and thumb, at a suitable position along the length of the stick portion, said weight device extends rearwardly of the finger and thumb and the weight device and the stick portion will be able to find a pivot point, with the weight device biassing the movement of the stick portion, and providing stimulation of muscles and wherein said weight device in turn comprises, a cylinder body portion attached to the rear end of the stick portion,
   a sleeve, integral with said cylinder portion receiving the rearward end of the stick portion;
   a main bore in said cylinder portion, and having internal threads in said main bore,
   a passage extending from said main bore through to said sleeve
   a fastening device within the cylinder body portion passing from said main bore through said passage fastening said cylinder body to said stick portion;
   a plurality of weights, attachable to said cylinder body portion, for varying the weighting of the stick portion to suit the ability or an exercise desired, and
   a weight fastener received in said main bore of said sleeve for fastening said weights to said sleeve.

2. A exercise training device as claimed in claim 1 wherein the stick portion is a portion of a drum stick.

3. A exercise training device as claimed in claim 2 including a plurality of concave indentations formed in said stick portion at spaced intervals there along.

4. A exercise training device comprising; a stick portion adapted to be grasped with the hand, said stick portion defining a forward and rear end;

a weight device attached to said rear end of the stick portion, whereby when the stick portion is grasped, with the finger and thumb, at a suitable position along the length of the stick portion, wherein said weight device extends rearwardly of the finger and thumb and the weight device and the stick portion will be able to find a pivot point, with the weight device biassing the movement of the stick portion, and providing stimulation of muscles and wherein said weight device in turn comprises, a cylinder body portion attached to the rear end of the stick portion, a sleeve, integral with said cylinder portion receiving the rearward end of the stick portion;

a main bore in said cylinder portion, and having internal threads in said main bore, a plurality of weights, attachable to said cylinder body portion, for varying the weighting of the stick portion to suit the ability or an exercise desired, and a weight fastener received in said main bore of said sleeve for fastening said weights to said sleeve;

and adhesive fastening within the cylinder body portion fastening the same to the stick portion.

* * * * *